(12) United States Patent
Ishikawa

(10) Patent No.: US 9,193,345 B2
(45) Date of Patent: Nov. 24, 2015

(54) AUTOMATIC TRANSMISSION AND METHOD FOR CONTROLLING THE SAME

(71) Applicant: HONDA MOTOR CO., LTD., Tokyo (JP)

(72) Inventor: Yutaka Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/199,921

(22) Filed: Mar. 6, 2014

(65) Prior Publication Data

US 2014/0256508 A1 Sep. 11, 2014

(30) Foreign Application Priority Data

Mar. 7, 2013 (JP) ................. 2013-045851

(51) Int. Cl.
*F16H 3/74* (2006.01)
*B60W 10/06* (2006.01)
*B60W 10/10* (2012.01)
*B60W 10/196* (2012.01)
*F16H 61/68* (2006.01)

(52) U.S. Cl.
CPC .............. *B60W 10/10* (2013.01); *B60W 10/06* (2013.01); *B60W 10/196* (2013.01); *F16H 61/68* (2013.01); *F16H 2710/04* (2013.01); *Y10T 477/644* (2015.01)

(58) Field of Classification Search
CPC ... B60W 10/06; B60W 10/10; B60W 10/196; F16H 2710/04; F16H 61/68
See application file for complete search history.

(56) References Cited

U.S. PATENT DOCUMENTS

| 5,593,365 A * | 1/1997 | Tabata et al. ................. 477/119 |
| 5,709,140 A * | 1/1998 | Hirose ............................ 91/459 |
| 7,540,824 B2 | 6/2009 | Hinami et al. |
| 8,182,397 B2 * | 5/2012 | Shimizu et al. ............... 477/127 |
| 2011/0124463 A1* | 5/2011 | Sugino .......................... 475/296 |
| 2014/0213408 A1* | 7/2014 | Shibamura et al. .......... 475/275 |
| 2014/0287867 A1* | 9/2014 | Shibamura et al. .......... 475/269 |

FOREIGN PATENT DOCUMENTS

| GB | 2291942 A * | 2/1996 |
| JP | 2007-024136 | 2/2007 |
| JP | 2012-097864 | 5/2012 |
| JP | 2012-154425 | 8/2012 |

OTHER PUBLICATIONS

Japanese Office Action for corresponding JP Application No. 2013-045851, Sep. 30, 2014.

* cited by examiner

*Primary Examiner* — Tisha Lewis
(74) *Attorney, Agent, or Firm* — Mori & Ward, LLP

(57) ABSTRACT

An automatic transmission includes an input member, a planetary gear set, a plurality of engagement mechanisms, an output member, a switching mechanism, an engine braking determination device, a vehicle speed detector, and a controller. The controller is configured to prevent the switching mechanism from switching a mode from a fixed mode to a reverse rotation prevention mode when a shift position is changed from a reverse drive range to a forward drive range, and if the engine braking determination device determines that a vehicle is in an engine braking mode or if a travel speed of the vehicle detected by the vehicle speed detector is higher than a predetermined speed.

16 Claims, 8 Drawing Sheets

FIG. 4

| | B1 | B2 | B3 | B4 | C1 | C2 | C3 | TRANSMISSION GEAR RATIO | COMMON RATIO |
|---|---|---|---|---|---|---|---|---|---|
| Rvs | F | F | ○ | | | ○ | | 4.008 | |
| 1st | R/F | R/F | ○ | | | | | 5.233 | 1.554 |
| 2nd | R | R/F | ○ | | | | | 3.367 | 1.465 |
| 3rd | R | R/F | ○ | | | ○ | | 2.298 | 1.348 |
| 4th | R | R/F | | | | ○ | ○ | 1.705 | 1.251 |
| 5th | R | R/F | | | ○ | ○ | | 1.363 | 1.363 |
| 6th | R | R | ○ | | ○ | ○ | | 1.000 | 1.273 |
| 7th | R | R | ○ | | ○ | | ○ | 0.786 | 1.196 |
| 8th | R | R | ○ | | ○ | | ○ | 0.657 | 1.126 |
| 9th | R | R | | ○ | ○ | | | 0.584 | 1.120 |
| 10th | R | R | | ○ | ○ | | ○ | 0.520 | |

AUTOMATIC TRANSMISSION AND METHOD FOR CONTROLLING THE SAME

CROSS-REFERENCE TO RELATED APPLICATIONS

The present application claims priority under 35 U.S.C. §119 to Japanese Patent Application No. 2013-045851, filed Mar. 7, 2013, entitled "Automatic Transmission." The contents of this application are incorporated herein by reference in their entirety.

BACKGROUND

1. Field

The present disclosure relates to an automatic transmission and a method for controlling the automatic transmission.

2. Description of the Related Art

An automatic transmission capable of providing 8-forward-speed and 1-reverse-speed transmission using a four planetary gear sets and six engagement mechanisms formed from clutches and brakes has been developed (refer to, for example, Japanese Unexamined Patent Application Publication No. 2012-97864).

The automatic transmission described in Japanese Unexamined Patent Application Publication No. 2012-97864 includes an input shaft rotatably supported by a casing and an output member formed from an output gear disposed so as to be concentric with the input shaft inside the casing. Rotation of the output member is transferred to the right and left drive wheels of a vehicle via a differential gear or a propeller shaft.

First to fourth planetary gear sets are disposed in the casing so as to be concentric with one another. The first planetary gear set is a single-pinion planetary gear set including the following three elements: a first sun gear, a first ring gear, and a first carrier that supports a first pinion meshed with the first sun gear and the first ring gear so that the first pinion is rotatable about its axis and is revolvable around the first sun gear. When the carrier is fixed and if the sun gear is rotated, the ring gear rotates in opposite direction to the sun gear rotation. Accordingly, a single-pinion planetary gear set is also referred to as a "minus planetary gear set" or a "negative planetary gear set". Note that when the ring gear is fixed and if the sun gear is rotated, the carrier and the sun gear rotate in the same direction.

Referring to a collinear diagram (a diagram indicating relative rotational speed ratios among three elements, that is, a ring gear, a carrier, and the ring gear, in the form of straight lines (speed lines)) of the first planetary gear set, if first, second, and third elements are sequentially disposed from one side of the collinear diagram, the first element represents the first sun gear, the second element represents the first carrier, and the third element represents the first ring gear.

Like the first planetary gear set, the second planetary gear set is a single-pinion planetary gear set including the following three elements: a second sun gear, a second ring gear, and a second carrier that supports a second pinion meshed with the second sun gear and the second ring gear so that the second pinion is rotatable about its axis and is revolvable around the second sun gear. If the three elements of the second planetary gear set are referred to as a fourth element, a fifth element, and a sixth element sequentially disposed from one side of the collinear diagram of the second planetary gear set, the fourth element represents the second ring gear, the fifth element represents the second carrier, and the sixth element represents the second sun gear.

Like the first planetary gear set, the third planetary gear set is a single-pinion planetary gear set including the following three elements: a third sun gear, a third ring gear, and a third carrier that supports a third pinion meshed with the third sun gear and the third ring gear so that the third pinion is rotatable about its axis and is revolvable around the third sun gear. If the three elements of the third planetary gear set are referred to as a seventh element, an eighth element, and a ninth element sequentially disposed from one side of the collinear diagram of the third planetary gear set, the seventh element represents the third sun gear, the eighth element represents the third carrier, and the ninth element represents the third ring gear.

Like the first planetary gear set, the fourth planetary gear set is a single-pinion planetary gear set including the following three elements: a fourth sun gear, a fourth ring gear, and a fourth carrier that supports a fourth pinion meshed with the fourth sun gear and the fourth ring gear so that the fourth pinion is rotatable about its axis and is revolvable around the fourth sun gear. If the three elements of the fourth planetary gear set are referred to as a tenth element, an eleventh element, and a twelfth element sequentially disposed from one side of the collinear diagram of the fourth planetary gear set, the tenth element represents the fourth ring gear, the eleventh element represents the fourth carrier, and the twelfth element represents the fourth sun gear.

The first sun gear (the first element) of the first planetary gear set is connected to the input shaft. In addition, the fourth ring gear (the tenth element) of the fourth planetary gear set is connected to the output member.

In addition, the first carrier (the second element) of the first planetary gear set is connected to the second carrier (the fifth element) of the second planetary gear set and the third ring gear (the ninth element) of the third planetary gear set and, thus, a first connected member (the second element, the fifth element, the ninth element) is formed. Furthermore, the first ring gear (the third element) of the first planetary gear set is connected to the fourth sun gear (the twelfth element) of the fourth planetary gear set and, thus, a second connected member (the third element, the twelfth element) is formed. Still furthermore, the third carrier (the eighth element) of the third planetary gear set is connected to the fourth carrier (the eleventh element) of the fourth planetary gear set and, thus, a third connected member (the eighth element, the eleventh element) is formed.

In addition, the automatic transmission described in Japanese Unexamined Patent Application Publication No. 2012-97864 includes six engagement mechanisms formed from three clutches, that is, first to third clutches, and three brakes, that is, first to third brakes.

The first clutch is a wet multiple disc clutch. The first clutch is configured so as to be switchable between a connection mode in which the first sun gear (the first element) of the first planetary gear set is connected to the third connected member (the eighth element, the eleventh element) and a release mode in which the first sun gear is disconnected from the third connected member. The second clutch is also a wet multiple disc clutch. The second clutch is configured so as to be switchable between a connection mode in which the first sun gear (the first element) of the first planetary gear set is connected to the second ring gear (the fourth element) of the second planetary gear set and a release mode in which the first sun gear is disconnected from the second ring gear.

The third clutch is a wet multiple disc clutch. The third clutch is configured so as to be switchable between a connection mode in which the second sun gear (the sixth element) of the second planetary gear set is connected to the second connected member (the third element, the twelfth element)

and a release mode in which the second sun gear is disconnected from the second connected member. The first brake is a wet multiple disc brake. The first brake is configured so as to be switchable between a fixed mode in which the third connected member (the eighth element, the eleventh element) is fixed to the casing and a release mode in which the third connected member is unfixed from the casing.

A second brake is a wet multiple disc brake. The second brake is configured so as to be switchable between a fixed mode in which the third sun gear (the seventh element) of the third planetary gear set is fixed to the casing and a release mode in which the third sun gear is unfixed from the casing. A third brake is a wet multiple disc brake. The third brake is configured so as to be switchable between a fixed mode in which the second sun gear (the sixth element) of the second planetary gear set is fixed to the casing and a release mode in which the second sun gear is unfixed from the casing.

According to the automatic transmission described in Japanese Unexamined Patent Application Publication No. 2012-97864, by setting each of the first brake, the second brake, and the third brake in a fixed mode, a first forward speed ratio is established. By setting the second brake and the third brake in the fixed mode and setting the third clutch in the connection mode, a second forward speed ratio is established. By setting the second brake and the third brake in the fixed mode and setting the second clutch in the connection mode, a third forward speed ratio is established. By setting the second brake in the fixed mode and setting the second clutch and the third clutch in the connection mode, a fourth forward speed ratio is established.

By setting the second brake in the fixed mode and setting the first clutch and the second clutch in a connection mode, a fifth forward speed ratio is established. By setting the first to third clutches in the connection mode, a sixth forward speed ratio is established. By setting the third brake in the fixed mode and setting the first clutch and the second clutch in the connection mode, a seventh forward speed ratio is established. By setting the third brake in a fixed mode and setting the first clutch and the third clutch in the connection mode, an eighth forward speed ratio is established. By setting the first brake and the third brake in the fixed mode and setting the second clutch in the connection mode, a reverse speed ratio is established.

SUMMARY

According to one aspect of the present invention, an automatic transmission includes an input member, a planetary gear set, a plurality of engagement mechanisms, an output member, a switching mechanism, an engine braking determination device, a vehicle speed detector, and a controller. The input member is disposed in a casing to receive power transferred from a drive source. The planetary gear set includes a plurality of elements. The plurality of engagement mechanisms are each capable of connecting the plurality of elements to each other or connecting the plurality of elements to the casing. The output member outputs the power transferred from the input member. The output member has a first rotational speed different from a second rotational speed of the input member. The switching mechanism switches a mode of one of the plurality of elements between a reverse rotation prevention mode in which a forward rotation is allowed and a reverse rotation is prevented and a fixed mode in which the one of the plurality of elements is fixed to the casing. The forward rotation represents a rotation in a direction to move a vehicle forward. The reverse rotation represents a rotation in a direction to move the vehicle backward. The engine braking determination device is configured to determine based on predetermined vehicle information whether the vehicle is in an engine braking mode in which engine braking occurs. The vehicle speed detector is configured to detect a travel speed of the vehicle. The controller is configured to control the plurality of engagement mechanisms and to control the switching mechanism to be in the reverse rotation prevention mode when a shift position is set to a forward drive range and to be in the fixed mode when the shift position is set to a reverse drive range. The controller is configured to prevent the switching mechanism from switching the mode from the fixed mode to the reverse rotation prevention mode when the shift position is changed from the reverse drive range to the forward drive range, and if the engine braking determination device determines that the vehicle is in the engine braking mode or if the travel speed of the vehicle detected by the vehicle speed detector is higher than a predetermined speed.

According to another aspect of the present invention, in a method for controlling an automatic transmission, the automatic transmission includes an input member, a planetary gear set, a plurality of engagement mechanisms, an output member, and a switching mechanism. The input member is disposed in a casing and configured to receive power transferred from a drive source thereto. The planetary gear set includes a plurality of elements. The plurality of engagement mechanisms are each capable of connecting the plurality of elements to each other or connecting one of the plurality of elements to the casing. In the output member, a rotational speed of the input member is changed to a plurality of speeds and is output from the output member. The switching mechanism is capable of switching one of the plurality of elements between a reverse rotation prevention mode in which forward rotation representing rotation in a direction to move a vehicle forward is allowed and reverse rotation representing rotation in a direction to move the vehicle backward is prevented and a fixed mode in which the one of the plurality of elements is fixed to the casing. Whether the vehicle is in an engine braking mode in which engine braking occurs is determined based on predetermined vehicle information using an engine braking determination device.

A travel speed of the vehicle is detected using a vehicle speed detector. The switching mechanism is set in the reverse rotation prevention mode if a shift position is in forward drive range. The switching mechanism is set in the fixed mode if the shift position is in reverse drive range. A switching of the switching mechanism from the fixed mode to the reverse rotation prevention mode is prevented if the engine braking determination device determines that the vehicle is in the engine braking mode or if the travel speed of the vehicle detected by the vehicle speed detector is higher than a predetermined speed.

According to further aspect of the present invention, in a method for controlling an automatic transmission of a vehicle, a planetary gear set including a plurality of elements is provided. The plurality of elements are connected to each other or to a casing of the automatic transmission. A mode of one of the plurality of elements are switched between a reverse rotation prevention mode in which a forward rotation is allowed and a reverse rotation is prevented and a fixed mode in which the one of the plurality of elements is fixed to the casing. The forward rotation represents a rotation in a direction to move the vehicle forward. The reverse rotation represents a rotation in a direction to move the vehicle backward. Whether the vehicle is in an, engine braking mode in which engine braking occurs is determined based on predetermined vehicle information. A travel speed of the vehicle is detected. The mode is controlled to be in the reverse rotation prevention mode when a shift position is set to a forward drive range and to be in the fixed mode when the shift position is set to a reverse drive range. Switching from the fixed mode to the reverse rotation prevention mode is prevented when the shift position is changed from the reverse drive range to the forward drive range, and if the vehicle is determined to be in the engine braking mode or if the travel speed of the vehicle is higher than a predetermined speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 illustrates all the modes of engagement mechanisms in the transmission gear ratios of the automatic transmission according to the exemplary embodiment.

DESCRIPTION OF THE EMBODIMENTS

Figure 1:
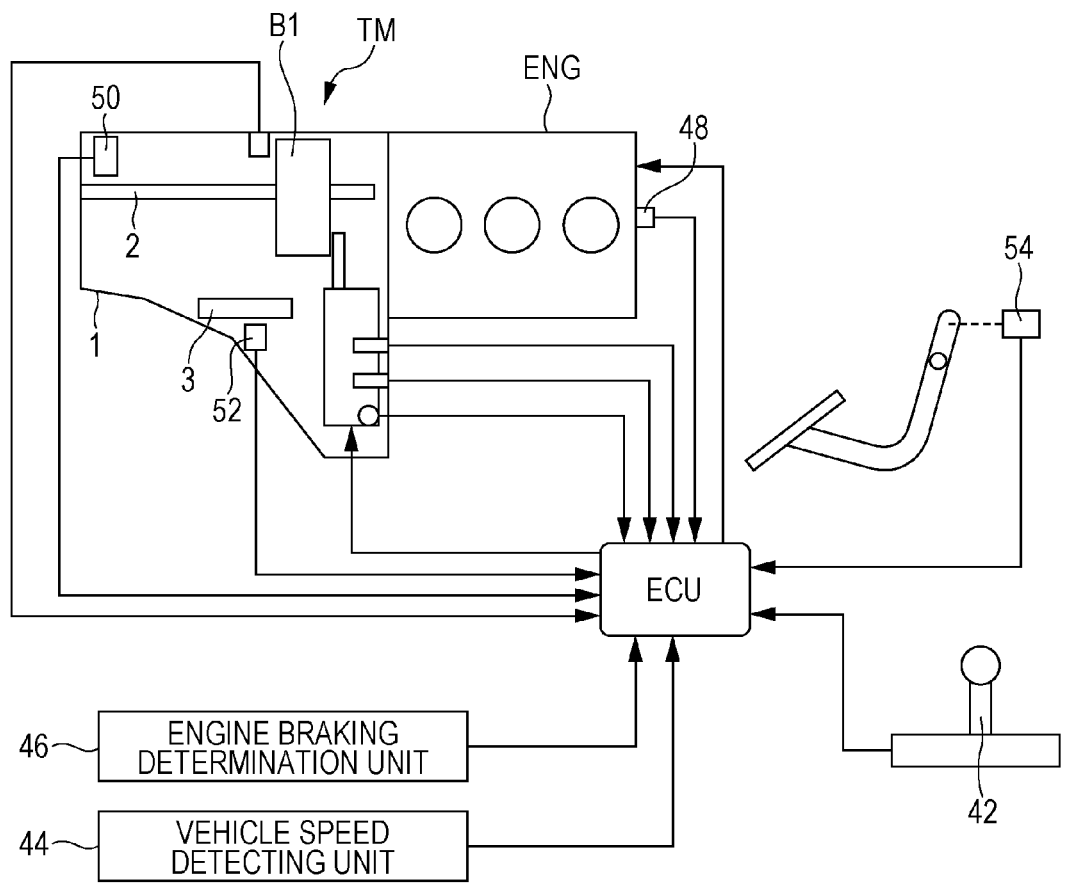
FIG. 1 is a schematic illustration of an automatic transmission according to an exemplary embodiment of the present disclosure.

The embodiments will now be described with reference to the accompanying drawings, wherein like reference numerals designate corresponding or identical elements throughout the various drawings.

Figure 2:
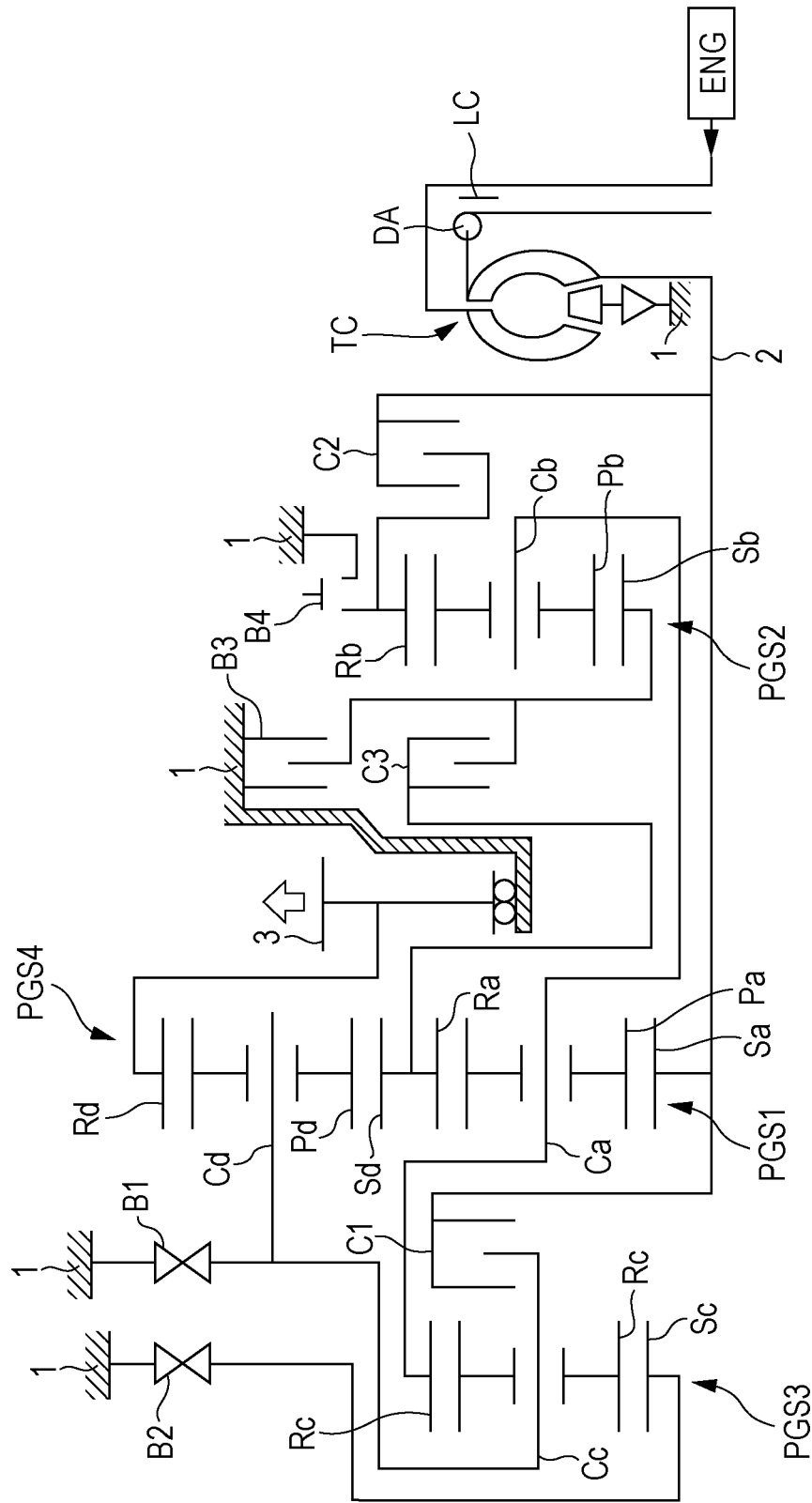
FIG. 2 is a skeleton diagram of the automatic transmission according to the exemplary embodiment of the present disclosure.

FIG. 1 is a schematic illustration of an automatic transmission TM according to an exemplary embodiment of the present disclosure. FIG. 2 is a skeleton diagram of the automatic transmission TM according to the exemplary embodiment of the present disclosure. The automatic transmission TM includes an input shaft 2 rotatably supported in a transmission case 1 and an output member 3 formed from an output gear disposed so as to be concentric with the input shaft 2. A driving force output from a drive source ENG (not illustrated), such as an internal combustion engine (an engine), is transferred to the input shaft 2 via a torque converter TC including a lockup clutch LC and a damper DA.

The rotation of the output member 3 is transferred to the right and left drive wheels of a vehicle via a differential gear or a propeller shaft (neither is illustrated). Note that instead of the torque converter TC, a single disc start clutch or a multiple disc start clutch that is frictionally engageable may be employed.

In the transmission case 1, first to fourth planetary gear sets PGS1 to PGS4 are arranged so as to be concentric with the input shaft 2. The first planetary gear set PGS1 is a single-pinion planetary gear set including a sun gear Sa, a ring gear Ra, and a carrier Ca that supports a pinion Pa meshed with the sun gear Sa and the ring gear Ra so that the pinion Pa is rotatable about its axis and is revolvable around the sun gear Sa. When the carrier is fixed and if the sun gear is rotated, the ring gear rotates in opposite direction to the sun gear rotation. Accordingly, a single-pinion planetary gear set is also referred to as a "minus planetary gear set" or a "negative planetary gear set". Note that when the ring gear is fixed and if the sun gear is rotated, the carrier and the sun gear rotate in the same direction.

Figure 3:
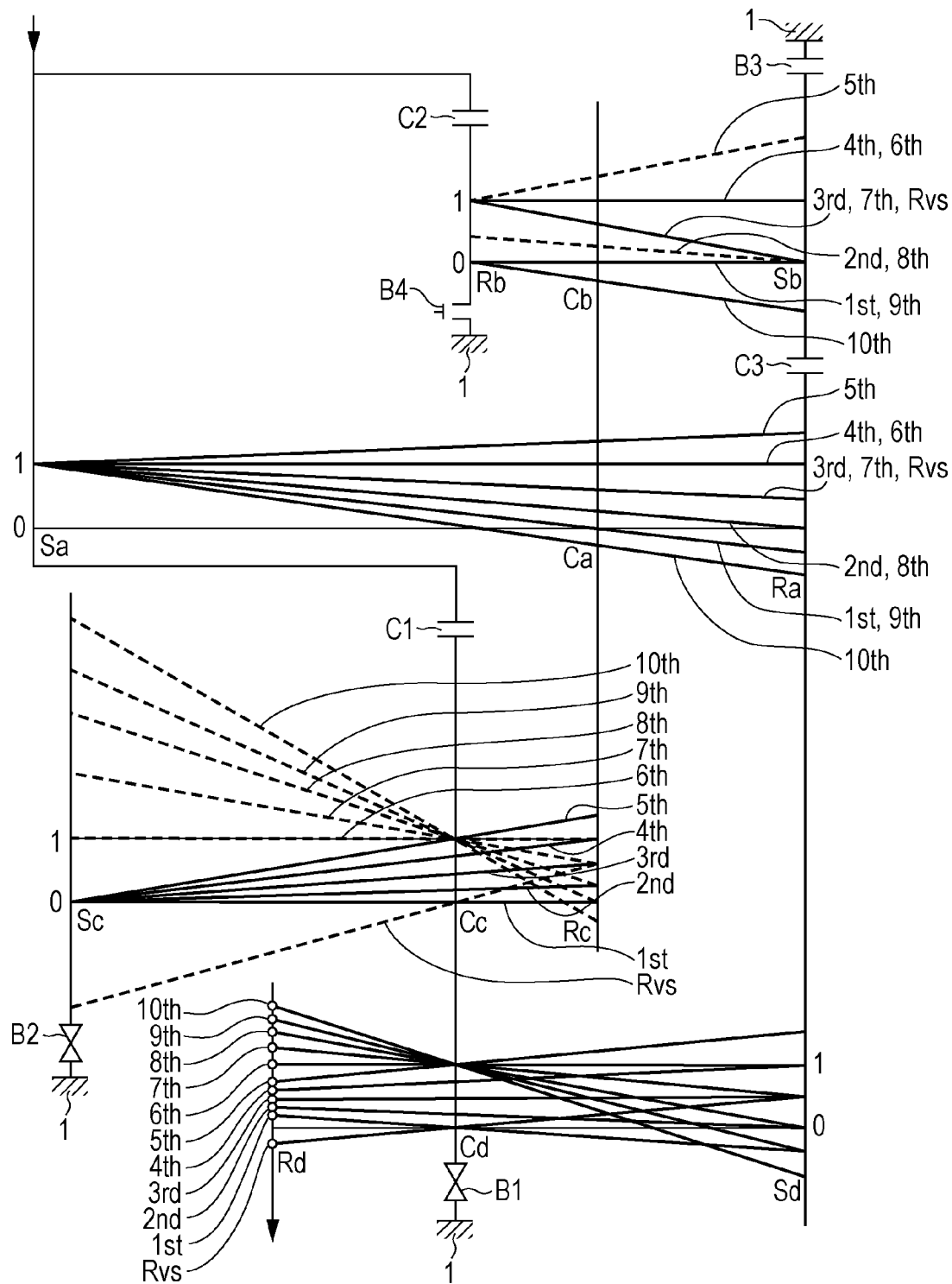
FIG. 3 is a collinear diagram of the automatic transmission according to the exemplary embodiment.

Referring to a collinear diagram (a diagram indicating relative rotational speed ratios among three elements, that is, a ring gear, a carrier, and the ring gear, in the form of straight lines (speed lines)) of the first planetary gear set PGS1 illustrated in a second section from the top of FIG. 3, let three elements Sa, Ca, and Ra of the first planetary gear set PGS1 denote a first element, a second element, and a third element arranged from the left at intervals corresponding to the gear ratios (the number of teeth of the ring gear/the number of teeth of the sun gear). Then, the first element corresponds to the sun gear Sa, the second element corresponds to the carrier Ca, and the third element corresponds to the ring gear Ra.

Herein, let h denote the gear ratio of the first planetary gear set PGS1. Then, the ratio of the distance between the sun gear Sa and the carrier Ca to the distance between the carrier Ca and the ring gear Ra is set to h:1. Note that the lower horizontal line and the upper horizontal line (a line that overlaps the line indicated by "4th" and "6th") indicate that the rotational speeds are "0" and "1" (i.e., the rotational speed is the same as the rotational speed of the input shaft 2), respectively.

Similarly, the second planetary gear set PGS2 is a single-pinion planetary gear set including a sun gear Sb, a ring gear Rb, and a carrier Cb that supports a pinion Pb meshed with the sun gear Sb and the ring gear Rb so that the pinion Pb is rotatable about its axis and is revolvable around the sun gear Sb.

Referring to the collinear diagram of the second planetary gear set PGS2 illustrated in a first section (the topmost section) of FIG. 3, let three elements Rb, Cb, and Sb of the second planetary gear set PGS2 denote a fourth element, a fifth element, and a sixth element arranged from the left at intervals corresponding to the gear ratios. Then, the fourth element corresponds to the ring gear Rb, the fifth element corresponds to the carrier Cb, and the sixth element corresponds to the sun gear Sb. The ratio of the distance between the sun gear Sb and the carrier Cb to the distance between the carrier Cb and the ring gear Rb is set to i:1, where "i" denotes the gear ratio of the second planetary gear set PGS2.

Similarly, the third planetary gear set PGS3 is a single-pinion planetary gear set including a sun gear Sc, a ring gear Rc, and a carrier Cc that supports a pinion Pc meshed with the sun gear Sc and the ring gear Rc so that the pinion Pc is rotatable about its axis and is revolvable around the sun gear Sc.

Referring to the collinear diagram of the third planetary gear set PGS3 illustrated in a third section from the top of FIG. 3, let three elements Sc, Cc, and Rc of the third planetary gear set PGS3 denote a seventh element, an eighth element, and a ninth element arranged from the left at intervals corresponding to the gear ratios. Then, the seventh element corresponds to the sun gear Sc, the eighth element corresponds to the carrier Cc, and the ninth element corresponds to the ring gear Rc. The ratio of the distance between the sun gear Sc and the carrier Cc to the distance between the carrier Cc and the ring gear Rc is set to j:1, where "j" denotes the gear ratio of the third planetary gear set PGS3.

Similarly, the fourth planetary gear set PGS4 is a single-pinion planetary gear set including a sun gear Sd, a ring gear Rd, and a carrier Cd that supports a pinion Pd meshed with the sun gear Sd and the ring gear Rd so that the pinion Pd is rotatable about its axis and is revolvable around the sun gear Sd.

Referring to the collinear diagram of the fourth planetary gear set PGS4 illustrated in a fourth section (the lowermost section) from the top of FIG. 3, let three elements Sd, Cd, and Rd of the fourth planetary gear set PGS4 denote a tenth element, an eleventh element, and a twelfth element arranged from the left at intervals corresponding to the gear ratios. Then, the tenth element corresponds to the ring gear Rd, the eleventh element corresponds to the carrier Cd, and the twelfth element corresponds to the sun gear Sd. The ratio of the distance between the sun gear Sd and the carrier Cd to the distance between the carrier Cd and the ring gear Rd is set to k:1, where "k" denotes the gear ratio of the fourth planetary gear set PGS4.

The sun gear Sa of the first planetary gear set PGS1 (the first element) is connected to the input shaft 2. In addition, the ring gear Rd of the fourth planetary gear set PGS4 (the tenth element) is connected to the output member 3 formed from the output gear.

In addition, the carrier Ca (the second element) of the first planetary gear set PGS1 is connected to the carrier Cb (the fifth element) of the second planetary gear set PGS2 and the ring gear Rc (the ninth element) of the third planetary gear set PGS3 and, thus, a first connected member Ca-Cb-Rc is formed. In addition, the ring gear Ra (the third element) of the first planetary gear set PGS1 is connected to the sun gear Sd (the twelfth element) of the fourth planetary gear set PGS4 and, thus, a second connected member Ra-Sd is formed. Furthermore, the carrier Cc (the eighth element) of the third planetary gear set PGS3 is connected to the carrier Cd (the eleventh element) of the fourth planetary gear set PGS4 and, thus, a third connected member Cc-Cd is formed.

Still furthermore, according to the present exemplary embodiment, the automatic transmission includes seven engagement mechanisms formed from three clutches, that is, first to third clutches C1 to C3, and four brakes, that is, first to fourth brakes B1 to B4.

The first clutch C1 is an oil pressure driven wet multiple disc clutch. The first clutch C1 is configured so as to be switchable between a connection mode in which the sun gear Sa (the first element) of the first planetary gear set PGS1 is connected to the third connected member Cc-Cd and a release mode in which the sun gear Sa is disconnected from the third connected member Cc-Cd. The second clutch C2 is an oil pressure driven wet multiple disc clutch. The second clutch C2 is configured so as to be switchable between a connection mode in which the sun gear Sa (the first element) of the first planetary gear set PGS1 is connected to the ring gear Rb (the fourth element) of the second planetary gear set PGS2 and a release mode in which the sun gear Sa is disconnected from the ring gear Rb.

The third clutch C3 is an oil pressure driven wet multiple disc clutch. The third clutch C3 is configured so as to be switchable between a connection mode in which the sun gear Sb (The sixth element) of the second planetary gear set PGS2 is connected to the second connected member Ra-Sd and a release mode in which the sun gear Sb is disconnected from the second connected member Ra-Sd. The first brake B1 is formed from a two-way clutch. The first brake B1 is configured so as to be switchable between a reverse rotation prevention mode in which the forward rotation (rotation in the same direction as that of the input shaft 2) of the third connected member Cc-Cd is allowed and the reverse rotation of the third connected member Cc-Cd is prevented and a fixed mode in which the third connected member Cc-Cd is fixed to the transmission case 1.

When the first brake B1 formed from a two-way clutch is in the reverse rotation prevention mode and if a force that tends to rotate the third connected member Cc-Cd in the forward rotation direction is exerted on the third connected member Cc-Cd, rotation of the third connected member Cc-Cd is allowed and, thus, the first brake B1 enters a release mode. However, if a force that tends to rotate the third connected member Cc-Cd in the reverse rotation direction is exerted on the third connected member Cc-Cd, rotation of the third connected member Cc-Cd is prevented and, thus, the first brake B1 enters the fixed mode in which the third connected member Cc-Cd is fixed to the transmission case 1. According to the present exemplary embodiment, the first brake B1 formed from a two-way clutch corresponds to a switching mechanism of an embodiment of the present disclosure.

The second brake B2 is formed from a two-way clutch. The second brake B2 is configured so as to be switchable between a forward rotation prevention mode in which forward rotation of the sun gear Sc (the seventh element) of the third planetary gear set PGS3 is prevented and a reverse rotation prevention mode in which reverse rotation of the sun gear Sc (the seventh element) of the third planetary gear set PGS3 is prevented.

When the second brake B2 formed from a two-way clutch is in the forward rotation prevention mode and if a force that tends to rotate the sun gear Sc (the seventh element) of the third planetary gear set PGS3 in the forward rotation direction is exerted on the sun gear Sc, rotation of the sun gear Sc is prevented, and the second brake B2 enters the fixed mode in which the sun gear Sc is fixed to the transmission case 1. In contrast, if a force that tends to rotate the sun gear Sc in the reverse rotation direction is exerted on the sun gear Sc, rotation of the sun gear Sc is allowed. Thus, the second brake B2 enters a release mode.

In addition, when second brake B2 formed from a two-way clutch is in the reverse rotation prevention mode and if a force that tends to rotate the sun gear Sc (the seventh element) of the third planetary gear set PGS3 in the forward rotation direction is exerted on the sun gear Sc, rotation of the sun gear Sc is allowed. Thus, the second brake B2 enters a release mode. In contrast, if a force that tends to rotate the sun gear Sc in the reverse rotation direction is exerted on the sun gear Sc, the rotation of the sun gear Sc is prevented and, thus, the second brake B2 enters the fixed mode in which the sun gear Sc is fixed to the transmission case 1. Note that the second brake B2 may be formed as an oil pressure driven wet multiple disc brake.

The third brake B3 is an oil pressure driven wet multiple disc brake. The third brake B3 is configured so as to be switchable between a fixed mode in which the sun gear Sb (the sixth element) of the second planetary gear set PGS2 is fixed to the transmission case 1 and a release mode in which the sun gear Sb is unfixed from the transmission case 1. The fourth brake B4 is formed from a dog clutch or a meshing mechanism serving as a synchromesh mechanism having a synchronous function. The fourth brake B4 is configured so as to be switchable between a fixed mode in which the ring gear Rb (the fourth element) of the second planetary gear set PGS2 is fixed to the transmission case 1 and a release mode in which the ring gear Rb is unfixed from the transmission case 1.

The mode of each of the clutches C1 to C3 and the brakes B1 to B4 is switchable under the control of a control unit ECU functioning as a transmission control unit TCU illustrated in FIG. 1 on the basis of vehicle information, such as a travel speed of the vehicle.

The second clutch C2, the second planetary gear set PGS2, the third clutch C3, the output member 3, the first planetary gear set PGS1, the first clutch C1, and the third planetary gear set PGS3 are arranged along the axis line of the input shaft 2 in sequence from the side adjacent to the drive source ENG and the torque converter TC.

The fourth brake B4 is disposed outward of the second planetary gear set PGS2 in the radial direction. The third brake B3 is disposed outward of the third clutch C3 in the radial direction. The first brake B1 is disposed outward of the first clutch C1 in the radial direction. The second brake B2 is disposed outward of the third planetary gear set PGS3 in the radial direction. By disposing the four brakes B1 to B4 outward of a planetary gear set or a clutch in the radial direction, the shaft length of the automatic transmission can be reduced, as compared with the case in which the brakes B1 to B4 are arranged along the axis line of the input shaft 2 together with a planetary gear set or a clutch. Note that the fourth brake B4 may be disposed outward of the second clutch C2 in the radial direction, and the third brake B3 may be disposed outward of the second planetary gear set PGS2 in the radial direction.

In addition, the fourth planetary gear set PGS4 is disposed outward of the first planetary gear set PGS1 in the radial direction. Furthermore, the ring gear Ra (the third element) of the first planetary gear set PGS1 is connected to the sun gear Sd (the twelfth element) of the fourth planetary gear set PGS4 in an integrated manner and, thus, the second connected member Ra-Sd is formed. By disposing the fourth planetary gear set PGS4 outward of the first planetary gear set PGS1 in the radial direction in this manner, the first planetary gear set PGS1 overlaps the fourth planetary gear set PGS4 in the radial direction and, thus, the shaft length of the automatic transmission can be decreased.

Note that the first planetary gear set PGS1 can at least partially overlap the fourth planetary gear set PGS4 in the radial direction. In this manner, the shaft length of the automatic transmission can be decreased. However, if the first planetary gear set PGS1 and the fourth planetary gear set PGS4 completely overlap each other in the radial direction, the shaft length of the automatic transmission can be minimized.

A technique for establishing each of the speed ratios of the automatic transmission according to the exemplary embodiment is described below with reference to FIGS. 3 and 4.

To achieve a first forward speed ratio, the first brake B1 and the second brake B2 each formed from a two-way clutch are set in the reverse rotation prevention mode, and the third brake B3 is set in the fixed mode. By setting the first brake B1 and the second brake B2 in the reverse rotation prevention mode, reverse rotation of the third connected member Cc-Cd and the sun gear Sc (the seventh element) of the third planetary gear set PGS3 is prevented. Thus, the rotational speeds of the third connected member Cc-Cd and the sun gear Sc (the seventh element) of the third planetary gear set PGS3 can be set to "0".

In this manner, the seventh to ninth elements Sc, Cc, and Rc of the third planetary gear set PGS3 enter a lock mode in which relative rotation of the elements is disabled. Accordingly, the rotational speed of the first connected member Ca-Cb-Rc including the ring gear Rc (the ninth element) of the third planetary gear set PGS3 is also set to "0". In addition, the rotational speed of the ring gear Rd (the tenth element) of the fourth planetary gear set PGS4 having the output member 3 connected thereto is set to "1st" illustrated in FIG. 3. In this manner, the first forward speed ratio is established.

Note that the third brake B3 need not be set in the fixed mode in order to achieve the first forward speed ratio. However, in order to smoothly change from the first forward speed ratio to a second forward speed ratio, the third brake B3 is set in the fixed mode in the first forward speed ratio. In addition, in order to activate an engine brake in the first forward speed ratio, the first brake B1 and the second brake B2 each formed from a two-way clutch can be switched to the forward rotation prevention mode.

In order to establish a second forward speed ratio, the first brake B1 and the second brake B2 each formed from a two-way clutch are set in the reverse rotation prevention mode, the third brake B3 is set in the fixed mode, and the third clutch C3 is set in a connection mode. By setting the first brake B1 in the reverse rotation prevention mode, forward rotation of the third connected member Cc-Cd is allowed. In addition, by setting the second brake B2 in the reverse rotation prevention mode, the rotational speed of the sun gear Sc (the seventh element) of the third planetary gear set PGS3 is set to "0". Furthermore, by setting the third brake B3 in the fixed mode, the rotational speed of the sun gear Sb (the sixth element) of the second planetary gear set PGS2 is set to "0".

In addition, by setting the third clutch C3 in a connection mode, the rotational speed of the second connected member Ra-Sd is set to "0", which is the same rotational speed as that of the sun gear Sb (the sixth element) of the second planetary gear set PGS2. Furthermore, the rotational speed of the ring gear Rd (the tenth element) of the fourth planetary gear set PGS4 having the output member 3 connected thereto is set to "2nd" illustrated in FIG. 3. In this manner, the second forward speed ratio is established. Note that in order to activate an engine brake in the second forward speed ratio, the second brake B2 formed from a two-way clutch can be switched to the forward rotation prevention mode.

In order to establish a third forward speed ratio, the first brake B1 and the second brake B2 each formed from a two-way clutch are set in a the reverse rotation prevention mode. In addition, the third brake B3 is set in a fixed mode, and the second clutch C2 is set in a connection mode. By setting the first brake B1 in the reverse rotation prevention mode, forward rotation of the third connected member Cc-Cd is allowed. In addition, by setting the second brake B2 in the reverse rotation prevention mode, the rotational speed of the sun gear Sc (the seventh element) of the third planetary gear set PGS3 is set to "0". Furthermore, by setting the third brake B3 in the fixed mode, the rotational speed of the sun gear Sb (the sixth element) of the second planetary gear set PGS2 is set to "0".

In addition, by setting the second clutch C2 in a connection mode, the rotational speed of the ring gear Rb (the fourth element) of the second planetary gear set PGS2 is set to "1", which is the same rotational speed as that of the sun gear Sa (the first element) of the first planetary gear set PGS1 connected to the input shaft 2. Since the rotational speed of the sun gear Sb (the sixth element) of the second planetary gear set PGS2 is set to "0" and the rotational speed of the ring gear Rb (the fourth element) is set to "1", the rotational speed of the carrier Cb (the fifth element), that is, the rotational speed of the first connected member Ca-Cb-Rc is set to i/(i+1).

In addition, the rotational speed of the ring gear Rd (the tenth element) of the fourth planetary gear set PGS4 having the output member 3 connected thereto is set to "3rd" illustrated in FIG. 3. In this manner, the third forward speed ratio is established. Note that in order to activate an engine brake in the third forward speed ratio, the second brake B2 formed from a two-way clutch can be switched to the forward rotation prevention mode.

In order to establish a fourth forward speed ratio, the first brake B1 and the second brake B2 each formed from a two-way clutch are set in a reverse rotation prevention mode, and the second clutch C2 and the third clutch C3 are set in a connection mode. By setting the first brake B1 in the reverse rotation prevention mode, forward rotation of the third connected member Cc-Cd is allowed. In addition, by setting the second brake B2 in the reverse rotation prevention mode, the rotational speed of the sun gear Sc (the seventh element) of the third planetary gear set PGS3 is set to "0".

Furthermore, by setting the third clutch C3 in the connection mode, the sun gear Sb (the sixth element) of the second planetary gear set PGS2 and the second connected member Ra-Sd rotate at the same speed. Thus, the carrier Ca (the second element) of the first planetary gear set PGS1 is connected to the carrier Cb (the fifth element) of the second planetary gear set PGS2, and the ring gear Ra (the third element) of the first planetary gear set PGS1 is connected to the sun gear Sb (the sixth element) of the second planetary gear set PGS2. Accordingly, in the fourth forward speed ratio in which the third clutch C3 is set in a connection mode, a collinear diagram including four elements in the first planetary gear set PGS1 and the second planetary gear set PGS2 can be obtained.

In addition, by setting the second clutch C2 in a connection mode, the rotational speed of the ring gear Rb (the fourth element) of the second planetary gear set PGS2 is set to the speed "1", which is the same rotational speed as that of the sun gear Sa (the first element) of the first planetary gear set PGS1. Accordingly, two of the four elements formed from the first planetary gear set PGS1 and the second planetary gear set PGS2 have the same rotational speed "1".

Accordingly, all the elements of the first planetary gear set PGS1 and the second planetary gear set PGS2 are set in a lock mode in which relative rotation of the elements is disabled and, thus, the rotational speeds of all of the elements of the first planetary gear set PGS1 and the second planetary gear set PGS2 are set to "1". In addition, the rotational speed of the third connected member Cc-Cd is set to j/(j+1), and the rotational speed of the ring gear Rd (the tenth element) of the fourth planetary gear set PGS4 having the output member 3 connected thereto is set to "4th" illustrated in FIG. 3. In this manner, the fourth forward speed ratio is established. Note that in order to activate an engine brake in the fourth forward speed ratio, the second brake B2 formed from a two-way clutch can be switched to the forward rotation prevention mode.

In order to establish a fifth forward speed ratio, the first brake B1 and the second brake B2 each formed from a two-way clutch are set in a the reverse rotation prevention mode, and the first clutch C1 and the second clutch C2 are set in a connection mode. By setting the first brake B1 in the reverse rotation prevention mode, forward rotation of the third connected member Cc-Cd is allowed. In addition, by setting the second brake B2 in the reverse rotation prevention mode, the rotational speed of the sun gear Sc (the seventh element) of the third planetary gear set PGS3 is set to "0".

In addition, by setting the first clutch C1 in a connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 having the output member 3 connected thereto is set to "5th" illustrated in FIG. 3. In this manner, the fifth forward speed ratio is established.

Note that in order to establish the fifth forward speed ratio, the second clutch C2 need not be set in the connection mode. However, in the fourth forward speed ratio and the sixth forward speed ratio (described in more detail below), the second clutch C2 needs to be set in a connection mode. Accordingly, in order to smoothly perform downshift from the fifth forward speed ratio to the fourth forward speed ratio and upshift from the fifth forward speed ratio to the sixth forward speed ratio (described below), the second clutch C2 is set in the connection mode even in the fifth forward speed ratio. Note that in order to activate an engine brake in the fifth forward speed ratio, the second brake B2 formed from a two-way clutch can be switched to the forward rotation prevention mode.

In order to establish a sixth forward speed ratio, the first brake B1 and the second brake B2 each formed from a two-way clutch are set in the reverse rotation prevention mode, and the first to third clutches C1 to C3 are set in the connection mode. By setting the first brake B1 in the reverse rotation prevention mode, forward rotation of the third connected member Cc-Cd is allowed. In addition, by setting the second brake B2 in the reverse rotation prevention mode, forward rotation of the sun gear Sc (the seventh element) of the third planetary gear set PGS3 is allowed.

In addition, by setting the second clutch C2 and the third clutch C3 in the connection mode, the elements of the first planetary gear set PGS1 and the second planetary gear set PGS2 are set in a mode in which relative rotation of the elements is disabled, as described in the fourth forward speed ratio. Thus, the rotational speed of the second connected member Ra-Sd is set to "1". In addition, by setting the first clutch C1 in the connection mode, the rotational speed of the third connected member Cc-Cd is set to "1".

Accordingly, the rotational speeds of the carrier Cd (the eleventh element) and the sun gear Sd (the twelfth element) of the fourth planetary gear set PGS4 are set to the same speed "1". Thus, the fourth planetary gear set PGS4 enters a lock mode in which relative rotation of the elements is disabled. Consequently, the rotational speed of the ring gear Rd (the tenth element) of the fourth planetary gear set PGS4 having the output member 3 connected thereto is set to "1" indicated by "6th" illustrated in FIG. 3. In this manner, the sixth forward speed ratio is established.

In order to establish a seventh forward speed ratio, the first brake B1 and the second brake B2 each formed from a two-way clutch are set in the reverse rotation prevention mode, the third brake B3 is set in the fixed mode, and the first clutch C1 and the second clutch C2 are set in the connection mode. By setting the first brake B1 in the reverse rotation prevention mode, forward rotation of the third connected member Cc-Cd is allowed. In addition, by setting the second brake B2 in the reverse rotation prevention mode, forward rotation of the sun gear Sc (the seventh element) of the third planetary gear set PGS3 is allowed.

In addition, by setting the third brake B3 in the fixed mode, the rotational speed of the sun gear Sb (the sixth element) of the second planetary gear set PGS2 is set to "0". Furthermore, by setting the second clutch C2 in the connection mode, the rotational speed of the ring gear Rb (the fourth element) of the second planetary gear set PGS2 is set to "1", which is the same rotational speed as that of the sun gear Sa (the first element) of the first planetary gear set PGS1. Thus, the rotational speed of the first connected member Ca-Cb-Rc including the carrier Cb (the fifth element) of the second planetary gear set PGS2 is set to i/(i+1).

Still furthermore, by setting the first clutch C1 in the connection mode, the rotational speed of the third connected member Cc-Cd is set to "1", which is the same rotational speed as that of the sun gear Sa (the first element) of the first planetary gear set PGS1 connected to the input shaft 2. Thus, the rotational speed of the ring gear Rd (the tenth element) of the fourth planetary gear set PGS4 having the output member 3 connected thereto is set to "7th" illustrated in FIG. 3. In this manner, the seventh forward speed ratio is established.

In order to establish an eighth forward speed ratio, the first brake B1 and the second brake B2 each formed from a two-way clutch are set in the reverse rotation prevention mode, the third brake B3 is set in the fixed mode, and the first clutch C1 and the third clutch C3 are set in the connection mode. By setting the first brake B1 in the reverse rotation prevention mode, forward rotation of the third connected member Cc-Cd is allowed. In addition, by setting the second brake B2 in the reverse rotation prevention mode, forward rotation of the sun gear Sc (the seventh element) of the third planetary gear set PGS3 is allowed.

In addition, by setting the third brake B3 in the fixed mode, the rotational speed of the sun gear Sb (the sixth element) of the second planetary gear set PGS2 is set to "0". Furthermore, by setting the third clutch C3 in the connection mode, the rotational speed of the second connected member Ra-Sd is set to "0", which is the same rotational speed as that of the sun gear Sb (the sixth element) of the second planetary gear set PGS2. Still furthermore, by setting the first clutch C1 in the connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 having the output member 3 connected thereto is set to "8th" illustrated in FIG. 3. In this manner, the eighth forward speed ratio is established.

In order to establish a ninth forward speed ratio, the first brake B1 and the second brake B2 each formed from a two-way clutch are set in the reverse rotation prevention mode, the third brake B3 and the fourth brake B4 are set in the fixed mode, and the first clutch C1 is set in the connection mode. By setting the first brake B1 in the reverse rotation prevention mode, forward rotation of the third connected member Cc-Cd is allowed. In addition, by setting the second brake B2 in the reverse rotation prevention mode, forward rotation of the sun gear Sc (the seventh element) of the third planetary gear set PGS3 is allowed.

In addition, by setting the third brake B3 in the fixed mode, the rotational speed of the sun gear Sb (the sixth element) of the second planetary gear set PGS2 is set to "0". Furthermore, by setting the fourth brake B4 in the fixed mode, the rotational speed of the ring gear Rb (the fourth element) of the second planetary gear set PGS2 is also set to "0". Accordingly, the elements Sb, Cb, and Rb of the second planetary gear set PGS2 enter a lock mode in which relative rotation of the elements is disabled. Thus, the rotational speed of the first connected member Ca-Cb-Rc including the carrier Cb (the fifth element) of the second planetary gear set PGS2 is also set to "0".

Still furthermore, by setting the first clutch C1 in the connection mode, the rotational speed of the third connected member Cc-Cd is set to "1", which is the same rotational speed of the sun gear Sa (the first element) of the first planetary gear set PGS1. Thus, the rotational speed of the ring gear Rd (the tenth element) of the fourth planetary gear set PGS4 having the output member 3 connected thereto is set to "9th" illustrated in FIG. 3. In this manner, the ninth forward speed ratio is established.

In order to establish a tenth forward speed ratio, the first brake B1 and the second brake B2 each formed from a two-way clutch are set in the reverse rotation prevention mode, the fourth brake B4 is set in the fixed mode, and the first clutch C1 and the third clutch C3 are set in the connection mode. By setting the first brake B1 in the reverse rotation prevention mode, forward rotation of the third connected member Cc-Cd is allowed. In addition, by setting the second brake B2 in the reverse rotation prevention mode, forward rotation of the sun gear Sc (the seventh element) of the third planetary gear set PGS3 is allowed.

Furthermore, by setting the third clutch C3 in a connection mode, the second connected member Ra-Sd and the sun gear Sb (the sixth element) of the second planetary gear set PGS2 rotate at the same speed. Still furthermore, by setting the fourth brake B4 in the fixed mode, the rotational speed of the ring gear Rb (the fourth element) of the second planetary gear set PGS2 is set to "0". In addition, by setting the first clutch C1 in the connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 having the output member 3 connected thereto is set to "10th" illustrated in FIG. 3. In this manner, the tenth forward speed ratio is established.

In order to establish a reverse speed ratio, the first brake B1 and the third brake B3 each formed from a two-way clutch are set in the fixed mode, the second brake B2 is set in the forward rotation prevention mode, and the second clutch C2 is set in the connection mode. By setting the second brake B2 in the forward rotation prevention mode, reverse rotation of the sun gear Sc (the seventh element) of the third planetary gear set PGS3 is allowed. In addition, by setting the third brake B3 in the fixed mode and setting the second clutch C2 in the connection mode, the rotational speed of the first connected member Ca-Cb-Rc is set to i/(i+1). Furthermore, by setting the first brake B1 in a fixed mode, the rotational speed of the third connected member Cc-Cd is set to "0". Accordingly, the rotational speed of the ring gear Rd (the tenth element) of the fourth planetary gear set PGS4 having the output member 3 connected thereto is set to "Rvs" indicating reverse rotation illustrated in FIG. 3. In this manner, the reverse speed ratio is established.

Note that the speed line indicated by a dashed line in FIG. 3 indicates that among the four planetary gear sets PGS1 to PGS4, elements of the planetary gear sets other than the planetary gear set that transfers drive power rotate (rotate idle) while following the planetary gear set that transfers the drive power.

FIG. 4 illustrates all the modes of the clutches C1 to C3 and the brakes B1 to B4 in the above-described speed ratios. The symbol "O" in the columns of the first to third clutches C1 to C3, the third brake B3, and the fourth brake B4 indicates the connection mode or the fixed mode. The empty cells indicate the release mode. In addition, in the column of the first brake B1, the symbol "R" indicates the reverse rotation prevention mode, and the symbol "F" indicates the fixed mode. In the column of the second brake B2, the symbol "R" indicates the reverse rotation prevention mode, and the symbol "F" indicates the forward rotation prevention mode.

In addition, the symbols "R" and "F" with an underline indicate that the rotational speed of the third connected member Cc-Cd or the sun gear Sc (the seventh element) of the third planetary gear set PGS3 is set to "0" due to the effect of the first brake B1 or the second brake B2. In addition, the symbol "R/F" indicates that the reverse rotation prevention mode "R" is maintained at normal times, but the reverse rotation prevention mode "R" is switched to the fixed mode or forward rotation prevention mode "F" when an engine brake is activated.

FIG. 4 further illustrates the transmission gear ratio in each of the speed ratios (the rotational speed of the input shaft 2/the rotational speed of the output member 3) and the common ratios (the ratio of one of the transmission gear ratios to the next transmission ratio, that is, a value obtained by dividing a given transmission gear ratio by the transmission gear ratio that is one-step higher than the speed ratio). In FIG. 4, the gear ratio h of the first planetary gear set PGS1 is set to 2.734, the gear ratio i of the second planetary gear set PGS2 is set to 1.614, the gear ratio j of the third planetary gear set PGS3 is set to 2.681, and the gear ratio k of the fourth planetary gear set PGS4 is set to 1.914. As can be seen from FIG. 4, the common ratios can be set to appropriate values.

Figure 5A:
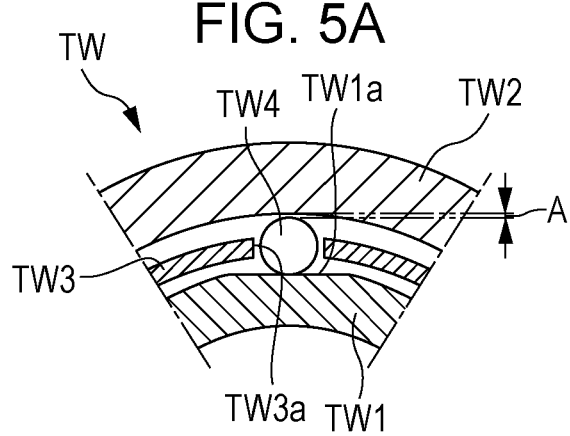
FIGS. 5A to 5C illustrate a two-way clutch according to the present exemplary embodiment.
Figure 5B:
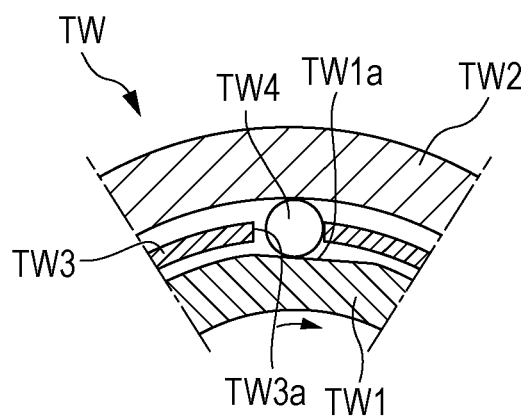
Figure 5C:
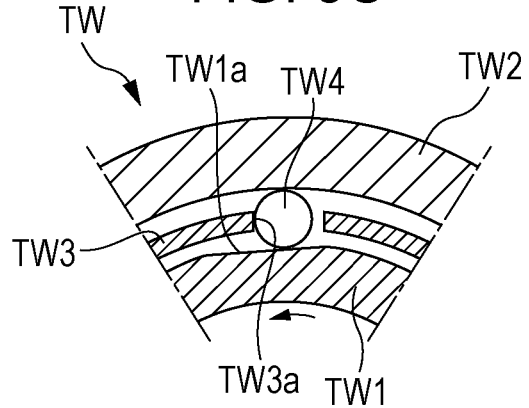

The two-way clutch that forms each of the first brake B1 and the second brake B2 is described in detail next with reference to FIGS. 5A to 5C. As illustrated in FIGS. 5A to 5C, a two-way clutch TW that forms the first brake B1 includes an inner ring TW1 connected to the third connected member Cc-Cd, an outer ring TW2 that is disposed outward of the inner ring TW1 in the radial direction with a spacing therebetween and that is connected to the transmission case 1, and a retaining ring TW3 disposed between the inner ring TW1 and the outer ring TW2.

The inner ring TW1 has a plurality of cam surfaces TW1a formed on the outer peripheral surface thereof. The retaining ring TW3 has a plurality of cutout holes TW3a each formed so as to correspond to one of the cam surfaces TW1a. Each of the cutout holes TW3a contains a roller TW4. In addition, the two-way clutch TW includes two electromagnetic clutches, that is, first and second electromagnetic clutches (not illustrated).

When powered on, the first electromagnetic clutch connects the outer ring TW2 to the retaining ring TW3. In contrast, when the first electromagnetic clutch is not powered on, the retaining ring TW3 is freely rotatable relative to the inner ring TW1 and the outer ring TW2.

The diameter of the roller TW4 is set so that when, as illustrated in FIG. 5A, the roller TW4 is located in the middle of the cam surface TW1a, a gap A appears and, when, as illustrated in FIGS. 5B and 5C, the roller TW4 is located at an end of the cam surface TW1a, the roller TW4 is in contact with the inner ring TW1 and the outer ring TW2.

When the first electromagnetic clutch is not powered on, the retaining ring TW3 can freely rotate. Accordingly, as illustrated in FIG. 5A, the roller TW4 can continuously stay in the middle of the cam surface TW1a.

In contrast, when the first electromagnetic clutch is powered on, the retaining ring TW3 is fixed to the transmission case 1 via the outer ring TW2. In this case, even when the inner ring TW1 attempts to rotate in the forward direction or the reverse direction, the roller TW4 is held at an end of the cam surface TW1a as illustrated in FIGS. 5B and 5C, since the retaining ring TW3 is fixed.

At that time, the roller TW4 is sandwiched by the cam surface TW1a and the inner peripheral surface of the outer ring TW2 and, thus, rotation of the inner ring TW1 is prevented. That is, the two-way clutch TW enters the fixed mode.

The second electromagnetic clutch is configured so as to be switchable among a first mode in which as illustrated in FIG. 5B, the cutout hole TW3a is located at one end of the cam surface TW1a and connects the retaining ring TW3 to the inner ring TW1, a second mode in which as illustrated in FIG. 5C, the cutout hole TW3a is located at the other end of the cam surface TW1a and connects the retaining ring TW3 to the inner ring TW1, a release mode in which the retaining ring TW3 is disconnected from the inner ring TW1.

Let a reverse rotation direction be defined as the counterclockwise direction in FIGS. 5A to 5C. Then, the two-way clutch TW can enter the reverse rotation prevention mode by setting the first electromagnetic clutch in a power-off mode (i.e., the first electromagnetic clutch is not powered on) to disconnect the outer ring TW2 from the retaining ring TW3 and setting the second electromagnetic clutch in the first mode.

In the case where the first brake B1 is formed from the two-way clutch TW, all of the speed ratios can be achieved by setting the two-way clutch TW in the fixed mode in the first and second forward gear ratios and the reverse gear ratio and setting the two-way clutch TW in the reverse rotation prevention mode in the third to eighth forward gear ratios. Note that when the vehicle is traveling in second forward speed ratio and if the control unit ECU functioning as a transmission control unit TCU predicts upshift to third forward speed ratio on the basis of the vehicle information, such as a travel speed, it is desirable that the two-way clutch TW be switched to the reverse rotation prevention mode in advance.

In this way, when the transmission upshifts from second to third forward speed ratio, the two-way clutch TW has already been switched to the reverse rotation prevention mode. Accordingly, by only setting the second brake B2 in the fixed mode, the upshift from second to third forward speed ratio can be accomplished and, thus, a shift change can be smoothly performed. As a result, the gear shift controllability of the automatic transmission can be improved.

In addition, unlike the case in which the first brake B1 is formed from a friction engagement type brake, if the first brake B1 is formed from a two-way clutch serving as the above-described mechanical engagement mechanism, friction loss occurring in the first brake B1 can be eliminated. Accordingly, like the case in which the first brake B1 is formed from a meshing mechanism, friction loss of the entire automatic transmission can be reduced. The two-way clutch of the second brake B2 is configured in the same way as the first brake B1.

Furthermore, as illustrated in FIG. 1, the control unit ECU serving as the transmission control unit TCU receives the following information items: the shift position of a shift lever 42, the travel speed of the vehicle output from a vehicle speed detecting unit 44, information as to whether the vehicle is in an engine braking mode output from an engine braking determination unit 46, information regarding the rotational speed of the drive source ENG output from a drive source rotational speed detecting unit 48, information regarding the rotational speed of the input shaft 2 output from an input rotational speed detecting unit 50, information regarding the rotational speed of the output member 3 output from an output rotational speed detecting unit 52, and information as to whether a brake pedal is depressed output from a brake pedal detecting unit 54.

Figure 6:
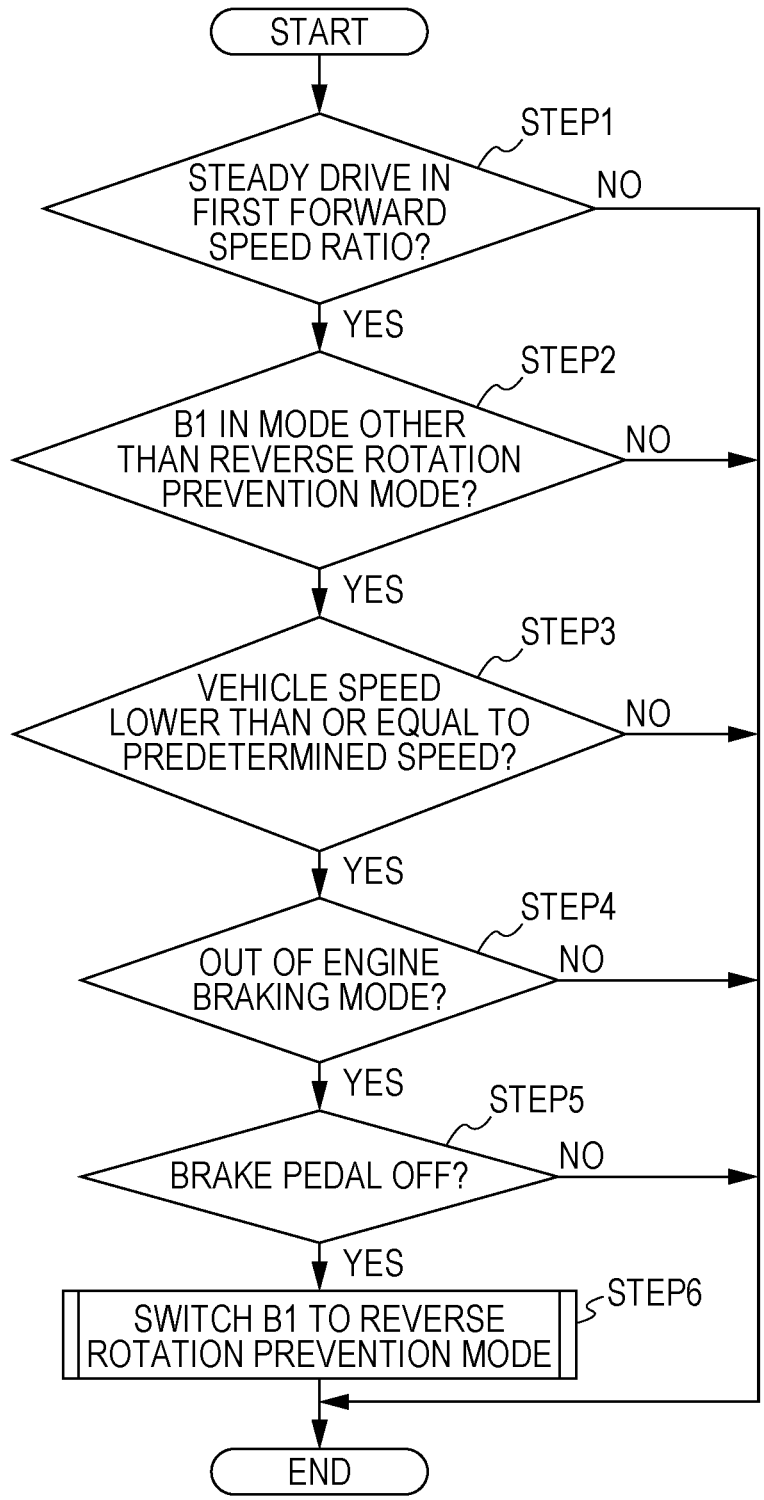
FIG. 6 is a flowchart illustrating the operation performed by a control unit according to the present exemplary embodiment.

FIG. 6 is a flowchart illustrating the operation performed by the control unit ECU serving as the transmission control unit TCU according to the present exemplary embodiment. The flowchart corresponds to a method for controlling the automatic transmission according to the present exemplary embodiment. Note that the control unit ECU is an electronic unit including, for example, a central processing unit (CPU) and a memory. By executing a control program stored in the memory using the CPU, the control unit ECU can control the clutches C1 to C3 and the brakes B1 to B4.

When the driver operates the shift lever 42 and changes the shift position from a reverse drive range to a forward drive range, the control unit ECU performs processing indicated by the flowchart illustrated in FIG. 6. When the shift position of the shift lever 42 is changed from a reverse drive range to a forward drive range, the control unit ECU performs the processing of FIG. 6 with a predetermined cycle time.

In step 1, the control unit ECU determines whether the vehicle is in steady drive condition in first forward speed ratio on the basis of predetermined vehicle information. If the vehicle is not in steady drive condition in first forward speed ratio ("No" in step 1 illustrated in FIG. 6), the processing is immediately completed.

However, if, in step 1, it is determined that the vehicle is in steady drive condition in first forward speed ratio, the processing proceeds to step 2, where it is determined whether the first brake B1 formed from a two-way clutch is in a mode other than the reverse rotation prevention mode (e.g., the fixed mode or a mode in which the fixed mode is being switched to the reverse rotation prevention mode or vice versa). If the first brake B1 is in the reverse rotation prevention mode, the processing is immediately completed.

However, if, in step 2, the first brake B1 is in a mode other than the reverse rotation prevention mode, the processing proceeds to step 3, where it is determined whether the travel speed of the vehicle detected by the vehicle speed detecting unit 44 is lower than or equal to a predetermined speed (e.g., 5 km/hour). If the travel speed of the vehicle detected by the vehicle speed detecting unit 44 is higher than the predetermined speed, the processing is immediately completed. In this manner, switching of the first brake B1 from the fixed mode to the reverse rotation prevention mode is prevented.

However, if, in step 3, the travel speed of the vehicle detected by the vehicle speed detecting unit 44 is lower than or equal to the predetermined speed, the processing proceeds to step 4, where it is determined whether the engine braking determination unit 46 determines that the vehicle is not in an engine braking mode.

The engine braking determination unit 46 determines that the vehicle is in an engine braking mode if the ratio of the rotational speed of the drive source ENG detected by the drive source rotational speed detecting unit 48 to the rotational speed of the input shaft 2 detected by the input rotational speed detecting unit 50 is higher than a predetermined value that indicates that engine braking occurs or if the rotational speed of the output member 3 detected by the output rotational speed detecting unit 52 is higher than a predetermined value.

Note that in FIG. 1, the control unit ECU is separated from the engine braking determination unit 46. However, the engine braking determination unit 46 may be configured as part of the control unit ECU.

If the engine braking determination unit 46 determines that the vehicle is in the engine braking mode, the processing is immediately completed. In this manner, switching of the first brake B1 from the fixed mode to the reverse rotation prevention mode is prevented.

However, if, in step 4, the engine braking determination unit 46 determines that the vehicle is not in the engine braking mode, the processing proceeds to step 5, where it is determined whether the brake pedal detecting unit 54 determines that the brake pedal is not depressed. If it is determined that the brake pedal detecting unit 54 determines that the brake pedal is depressed, the processing is immediately completed.

In this manner, switching of the first brake B1 from the fixed mode to the reverse rotation prevention mode is prevented.

However, if, in step 5, it is determined that the brake pedal detecting unit 54 determines that the brake pedal is not depressed, the processing proceeds to step 6, where the control unit ECU switches the first brake B1 from the fixed mode (or a current mode if switching of a mode is being made) to the reverse rotation prevention mode. Thereafter, the processing is completed.

Figure 7:
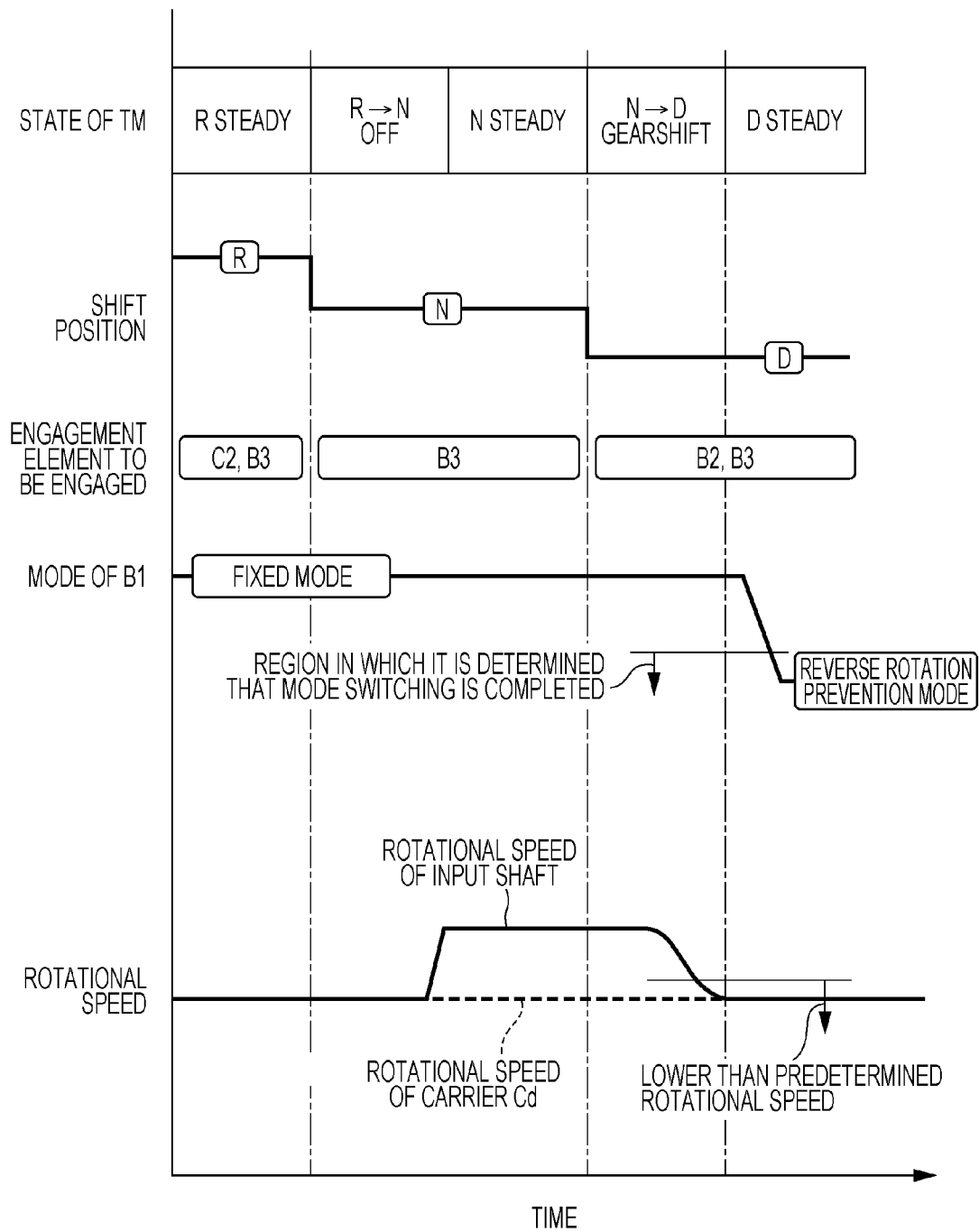
FIG. 7 illustrates the operation performed by a switching mechanism that processes switching of a shift position of a shift lever according to the present exemplary embodiment.
Figure 8:
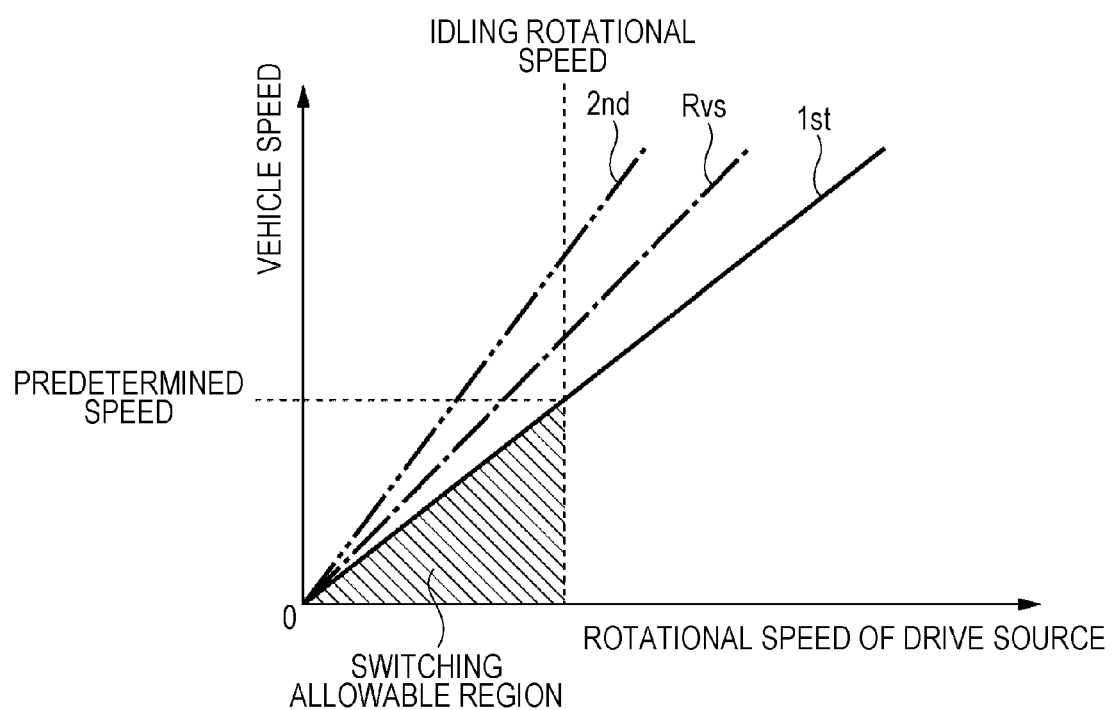
FIG. 8 is a graph indicating the switching allowable range of the switching mechanism in the automatic transmission according to the present exemplary embodiment.

FIG. 7 illustrates the operation performed by the first brake B1 serving as the switching mechanism that processes switching of a shift position of the shift lever 42 according to the present exemplary embodiment. According to the present exemplary embodiment, the following three shift positions are provided: "R" that indicates a reverse drive range, "N" that indicates a neutral drive range, and "D" that indicates a forward drive range. FIG. 8 is a graph indicating a switching allowable region in which switching of the first brake B1 serving as the switching mechanism is not inhibited (and is allowed). Note that in FIG. 8, the brake pedal is not depressed.

According to the automatic transmission of the present exemplary embodiment, when the driver operates the shift lever 42 to change the shift position from the reverse drive range to the forward drive range, the engine braking determination unit 46 determines that the vehicle is in the engine braking mode ("No" in step 4 illustrated in FIG. 6) and, thus, the control unit ECU prevents switching of the first brake B1 serving as the switching mechanism from the fixed mode to the reverse rotation prevention mode. Alternatively, if the vehicle speed detected by the vehicle speed detecting unit 44 is higher than a predetermined speed ("No" in step 3 illustrated in FIG. 6), the control unit ECU prevents switching of the first brake B1 from the fixed mode to the reverse rotation prevention mode.

Thus, if the vehicle is in the engine braking mode or if the vehicle speed is higher than the predetermined speed, the control unit ECU intentionally prevents switching of the first brake B1 from the fixed mode to the reverse rotation prevention mode. In this manner, the occurrence of a situation in which the first brake B1 cannot be switched from the fixed mode to the reverse rotation prevention mode even when the switching is attempted is prevented. In addition, the occurrence of a situation in which the first brake B1 does not normally operate during the switching is prevented. As a result, a relatively large load is not imposed on the first brake B1.

According to the present exemplary embodiment, the predetermined vehicle information is defined as the ratio of the rotational speed of the drive source ENG to the rotational speed of the input shaft 2 or as the rotational speed of the output member 3. In addition, if the ratio of the rotational speed of the drive source ENG to the rotational speed of the input shaft 2 is higher than a predetermined value or if the rotational speed of the output member 3 is higher than a predetermined-value, the engine braking determination unit 46 determines that the vehicle is in the engine braking mode.

Furthermore, according to the present exemplary embodiment, the brake pedal detecting unit 54 is provided. The brake pedal detecting unit 54 detects whether the brake pedal of the vehicle is depressed. When the shift position of the shift lever 42 is changed from the reverse drive range to the forward drive range and if the brake pedal detecting unit 54 detects that the brake pedal is depressed ("No" in step 5 illustrated in FIG. 6), the control unit ECU prevents the first brake B1 serving as the switching mechanism from being changed from the fixed mode to the reverse rotation prevention mode.

When the brake pedal is depressed by a driver, the vehicle may abruptly stop. At that time, as in the engine braking mode, a relatively large load is imposed on the first brake B1. Accordingly, if the first brake B1 is switched from the fixed mode to the reverse rotation prevention mode during the brake pedal being depressed, the switching of the first brake B1 from the fixed mode to the reverse rotation prevention mode may be failed, or the first brake B1 may malfunction during the switching operation. As a result, a relatively large load may be imposed on the first brake B1.

To solve such a problem, if, as described above, switching of the first brake B1 from the fixed mode to the reverse rotation prevention mode is prevented even during the brake pedal being depressed, the occurrence of a situation in which the first brake B1 malfunctions during the switching can be prevented. In this manner, a relatively large load imposed on the first brake B1 can be prevented.

While the present exemplary embodiment has been described with reference to the second brake B2 formed from a two-way clutch, the second brake B2 may be formed from a wet multiple disc brake or a meshing mechanism.

To form the second brake B2 from a wet multiple disc brake or a meshing mechanism, the first brake B1 is set in the fixed mode in first forward speed ratio and reverse speed ratio and is set in the release mode in the other speed ratios. In addition, the second brake B2 is set in the fixed mode in first to fifth forward speed ratios and is set in the release mode in the other speed ratios.

Furthermore, according to the automatic transmission of the present exemplary embodiment, any one of the speed ratios (e.g., the tenth forward speed ratio) may be removed, and a 9-forward-speed transmission may be configured.

While the present exemplary embodiment has been described with reference to a shift lever operation for changing the shift position, the technique for changing the shift position is not limited thereto. For example, the shift position may be changed by pressing a button. In such a case, for example, the selected shift position can be determined using a button pressing signal.

(1) According to an embodiment of the present disclosure, an automatic transmission includes an input member disposed in a casing and configured to receive power transferred from a drive source thereto, a planetary gear set including a plurality of elements, a plurality of engagement mechanisms each capable of connecting the elements to each other or connecting one of the elements to the casing, an output member, a control unit configured to control the engagement mechanisms, where a rotational speed of the input member is changed to a plurality of speeds and is output from the output member, and a switching mechanism capable of switching one of the elements between a reverse rotation prevention mode in which forward rotation representing rotation in a direction to move a vehicle forward is allowed and reverse rotation representing rotation in a direction to move the vehicle backward is prevented and a fixed mode in which the element is fixed to the casing, where the control unit sets the switching mechanism in the reverse rotation prevention mode when a shift position is set to a forward drive range and sets the switching mechanism in the fixed mode when the shift position is set to a reverse drive range, an engine braking determination unit configured to determine whether the vehicle is in an engine braking mode in which engine braking occurs on the basis of predetermined vehicle information, and a vehicle speed detecting unit configured to detect a travel speed of the vehicle. When the shift position is changed from the reverse drive range to the forward drive range and if the engine braking determination unit determines that the vehicle is in the engine braking mode or if the travel speed of the vehicle detected by the vehicle speed detecting unit is higher than a predetermined speed, the control unit prevents the switching of the switching mechanism from the fixed mode to the reverse rotation prevention mode.

According to the embodiment, when the driver operates the shift lever to change the shift position from the reverse drive range to the forward drive range and if the engine braking determination unit determines that the vehicle is in the engine braking mode or if the travel speed of the vehicle detected by the vehicle speed detecting unit is higher than the predetermined speed, the control unit prevents the switching mechanism from being switched from the fixed mode to the reverse rotation prevention mode. In this manner, when the vehicle is in the engine braking mode or the travel speed of the vehicle is higher than the predetermined speed, the switching of the switching mechanism from the fixed mode to the reverse rotation prevention mode is prevented and, thus, malfunction of the switching mechanism during switching is prevented. In addition, a relatively large load imposed on the switching mechanism can be prevented.

(2) According to the embodiment, the predetermined vehicle information can be one of a ratio of the rotational speed of the drive source to the rotational speed of the input member and the rotational speed of the output member. The engine braking determination unit can determine that the vehicle is in the engine braking mode if the ratio of the rotational speed of the drive source to the rotational speed of the input member is higher than a predetermined value or if the rotational speed of the output member is higher than a predetermined value.

(3) According to the embodiment, the automatic transmission can further include a brake pedal detecting unit configured to detect whether a brake pedal of the vehicle is depressed. When the shift position is switched from the reverse drive range to the forward drive range and if the brake pedal detecting unit detects that the brake pedal is depressed, it is desirable that the control unit prevent the switching of the switching mechanism from the fixed mode to the reverse rotation prevention mode.

When the brake pedal is depressed by a driver, the vehicle may abruptly stops. At that time, as in the engine braking mode, a relatively large load is imposed on the switching mechanism. Accordingly, if the switching mechanism is switched from the fixed mode to the reverse rotation prevention mode when the brake pedal is depressed, the switching of the switching mechanism from the fixed mode to the reverse rotation prevention mode may be failed, or the switching mechanism may malfunction during the switching. As a result, a relatively large load may be imposed on the switching mechanism.

Accordingly, as in the above-described case, when a brake pedal is depressed and if switching of the switching mechanism from the fixed mode to the reverse rotation prevention mode is prevented, malfunction of the switching mechanism during the switching operation can be prevented and, thus, a relatively large load imposed on the switching mechanism can be prevented.

(4) According to another embodiment of the present disclosure, a method for controlling an automatic transmission is provided. The automatic transmission includes an input member disposed in a casing and configured to receive power transferred from a drive source thereto, a planetary gear set including a plurality of elements, a plurality of engagement mechanisms each capable of connecting the elements to each other or connecting one of the elements to the casing, an output member, where a rotational speed of the input member is changed to a plurality of speeds and is output from the output member, and a switching mechanism capable of switching one of the elements between a reverse rotation prevention mode in which forward rotation representing rotation in a direction to move a vehicle forward is allowed and reverse rotation representing rotation in a direction to move the vehicle backward is prevented and a fixed mode in which the element is fixed to the casing. The method includes determining whether the vehicle is in an engine braking mode in which engine braking occurs on the basis of predetermined vehicle information using an engine braking determination unit, detecting a travel speed of the vehicle using a vehicle speed detecting unit, setting the switching mechanism in the reverse rotation prevention mode if the shift position is in forward drive range, setting the switching mechanism in the fixed mode if the shift position is in reverse drive range, and preventing the switching of the switching mechanism from the fixed mode to the reverse rotation prevention mode if the engine braking determination unit determines that the vehicle is in the engine braking mode or if the travel speed of the vehicle detected by the vehicle speed detecting unit is higher than a predetermined speed.

Through the control method according to the embodiment, failure of switching the switching mechanism from the fixed mode to the reverse rotation prevention mode can be prevented. Malfunction of the switching mechanism during the switching operation can be prevented, and a relatively large load imposed on the switching mechanism can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission comprising:
    an input member disposed in a casing to receive power transferred from a drive source;
    a planetary gear set including a plurality of elements;
    a plurality of engagement mechanisms each capable of connecting the plurality of elements to each other or connecting the plurality of elements to the casing;
    an output member to output the power transferred from the input member, the output member having a first rotational speed different from a second rotational speed of the input member;
    a switching mechanism to switch a mode of one of the plurality of elements between a reverse rotation prevention mode in which a forward rotation is allowed and a reverse rotation is prevented and a fixed mode in which said one of the plurality of elements is fixed to the casing, the forward rotation representing a rotation in a direction to move a vehicle forward, the reverse rotation representing a rotation in a direction to move the vehicle backward;
    an engine braking determination device configured to determine based on predetermined vehicle information whether the vehicle is in an engine braking mode in which engine braking occurs;
    a vehicle speed detector configured to detect a travel speed of the vehicle; and
    a controller configured to control the plurality of engagement mechanisms and to control the switching mechanism to be in the reverse rotation prevention mode when a shift position is set to a forward drive range and to be in the fixed mode when the shift position is set to a reverse drive range, the controller being configured to prevent the switching mechanism from switching the mode from the fixed mode to the reverse rotation prevention mode when the shift position is changed from the reverse drive range to the forward drive range, and if the engine braking determination device determines that the vehicle is in the engine braking mode or if the travel speed of the vehicle detected by the vehicle speed detector is higher than a predetermined speed.

2. The automatic transmission according to claim 1,
    wherein the predetermined vehicle information includes one of a ratio of a third rotational speed of the drive source to the second rotational speed of the input member and the first rotational speed of the output member, and
    wherein the engine braking determination device determines that the vehicle is in the engine braking mode if the ratio of the third rotational speed of the drive source to the second rotational speed of the input member is higher than a predetermined value or if the first rotational speed of the output member is higher than a predetermined value.

3. The automatic transmission according to claim 1, further comprising:
    a brake pedal detector configured to detect whether a brake pedal of the vehicle is depressed,
    wherein when the shift position is switched from the reverse drive range to the forward drive range and if the brake pedal detector detects that the brake pedal is depressed, the controller prevents a switching of the switching mechanism from the fixed mode to the reverse rotation prevention mode.

4. A method for controlling an automatic transmission, the automatic transmission including
    an input member disposed in a casing and configured to receive power transferred from a drive source thereto,
    a planetary gear set including a plurality of elements,
    a plurality of engagement mechanisms each capable of connecting the plurality of elements to each other or connecting one of the plurality of elements to the casing,
    an output member, where a rotational speed of the input member is changed to a plurality of speeds and is output from the output member, and
    a switching mechanism capable of switching one of the plurality of elements between a reverse rotation prevention mode in which forward rotation representing rotation in a direction to move a vehicle forward is allowed and reverse rotation representing rotation in a direction to move the vehicle backward is prevented and a fixed mode in which said one of the plurality of elements is fixed to the casing, the method comprising:
    determining whether the vehicle is in an engine braking mode in which engine braking occurs based on predetermined vehicle information using an engine braking determination device;
    detecting a travel speed of the vehicle using a vehicle speed detector;
    setting the switching mechanism in the reverse rotation prevention mode if a shift position is in forward drive range;
    setting the switching mechanism in the fixed mode if the shift position is in reverse drive range; and
    preventing a switching of the switching mechanism from the fixed mode to the reverse rotation prevention mode if the engine braking determination device determines that the vehicle is in the engine braking mode or if the travel speed of the vehicle detected by the vehicle speed detector is higher than a predetermined speed.

5. The automatic transmission according to claim 1, further comprising:
a brake pedal detector configured to detect whether a brake pedal of the vehicle is depressed,
wherein if the brake pedal detector detects that the brake pedal of the vehicle is not depressed and if the travel speed of the vehicle detected by the vehicle speed detector is higher than a predetermined value, the controller prevents the switching mechanism from switching the mode from the fixed mode to the reverse rotation prevention mode.

6. An automatic transmission comprising:
an input member disposed in a casing to receive power transferred from a drive source;
a planetary gear set including a plurality of elements;
a plurality of engagement mechanisms each capable of connecting the plurality of elements to each other or connecting the plurality of elements to the casing;
an output member to output the power transferred from the input member, the output member having a first rotational speed different from a second rotational speed of the input member;
a switching mechanism to switch a mode of one of the plurality of elements between a reverse rotation prevention mode in which a forward rotation is allowed and a reverse rotation is prevented and a fixed mode in which said one of the plurality of elements is fixed to the casing, the forward rotation representing a rotation in a direction to move a vehicle forward, the reverse rotation representing a rotation in a direction to move the vehicle backward;
engine braking determination means for determining based on predetermined vehicle information whether the vehicle is in an engine braking mode in which engine braking occurs;
vehicle speed detecting means for detecting a travel speed of the vehicle; and
control means for controlling the plurality of engagement mechanisms and controlling the switching mechanism to be in the reverse rotation prevention mode when a shift position is set to a forward drive range and to be in the fixed mode when the shift position is set to a reverse drive range, the control means being configured to prevent the switching mechanism from switching the mode from the fixed mode to the reverse rotation prevention mode when the shift position is changed from the reverse drive range to the forward drive range, and if the engine braking determination means determines that the vehicle is in the engine braking mode or if the travel speed of the vehicle detected by the vehicle speed detecting means is higher than a predetermined speed.

7. A method for controlling an automatic transmission of a vehicle, comprising:
providing a planetary gear set including a plurality of elements;
connecting the plurality of elements to each other or to a casing of the automatic transmission;
switching a mode of one of the plurality of elements between a reverse rotation prevention mode in which a forward rotation is allowed and a reverse rotation is prevented and a fixed mode in which said one of the plurality of elements is fixed to the casing, the forward rotation representing a rotation in a direction to move the vehicle forward, the reverse rotation representing a rotation in a direction to move the vehicle backward;
determining based on predetermined vehicle information whether the vehicle is in an engine braking mode in which engine braking occurs;
detecting a travel speed of the vehicle;
controlling the mode to be in the reverse rotation prevention mode when a shift position is set to a forward drive range and to be in the fixed mode when the shift position is set to a reverse drive range; and
preventing switching from the fixed mode to the reverse rotation prevention mode when the shift position is changed from the reverse drive range to the forward drive range, and if the vehicle is determined to be in the engine braking mode or if the travel speed of the vehicle is higher than a predetermined speed.

8. The method for controlling an automatic transmission according to claim 4,
wherein the predetermined vehicle information includes one of a ratio of a third rotational speed of the drive source to a second rotational speed of the input member and a first rotational speed of the output member, the rotational speed of the input member corresponding to the second rotational speed of the input member, and
wherein the engine braking determination device determines that the vehicle is in the engine braking mode if the ratio of the third rotational speed of the drive source to the second rotational speed of the input member is higher than a predetermined value or if the first rotational speed of the output member is higher than a predetermined value.

9. The method for controlling an automatic transmission according to claim 4, further comprising:
detecting whether a brake pedal of the vehicle is depressed using a brake pedal detector; and
preventing a switching of the switching mechanism from the fixed mode to the reverse rotation prevention mode when the shift position is switched from the reverse drive range to the forward drive range and if the brake pedal detector detects that the brake pedal is depressed.

10. The method for controlling an automatic transmission according to claim 4, further comprising:
detecting whether a brake pedal of the vehicle is depressed using a brake pedal detector; and
preventing the switching mechanism from switching the mode from the fixed mode to the reverse rotation prevention mode if the brake pedal detector detects that the brake pedal of the vehicle is not depressed and if the vehicle speed detector detects that the travel speed of the vehicle is higher than a predetermined value.

11. The automatic transmission according to claim 6,
wherein the predetermined vehicle information includes one of a ratio of a third rotational speed of the drive source to the second rotational speed of the input member and the first rotational speed of the output member, and
wherein the engine braking determination device determines that the vehicle is in the engine braking mode if the ratio of the third rotational speed of the drive source to the second rotational speed of the input member is higher than a predetermined value or if the first rotational speed of the output member is higher than a predetermined value.

12. The automatic transmission according to claim 6, further comprising:
brake pedal detecting means for detecting whether a brake pedal of the vehicle is depressed,
wherein when the shift position is switched from the reverse drive range to the forward drive range and if the brake pedal detecting means detects that the brake pedal is depressed, the control means prevents a switching of the switching mechanism from the fixed mode to the reverse rotation prevention mode.

13. The automatic transmission according to claim 6, further comprising:
    brake pedal detecting means for detecting whether a brake pedal of the vehicle is depressed,
    wherein if the brake pedal detecting means detects that the brake pedal of the vehicle is not depressed and if the travel speed of the vehicle detected by the vehicle speed detecting means is higher than a predetermined value, the control means prevents the switching mechanism from switching the mode from the fixed mode to the reverse rotation prevention mode.

14. The method for controlling an automatic transmission according to claim 7,
    wherein the predetermined vehicle information includes one of a ratio of a third rotational speed of a drive source to a second rotational speed of an input member and a first rotational speed of an output member, and
    wherein the vehicle is determined to be in the engine braking mode if the ratio of the third rotational speed of the drive source to the second rotational speed of the input member is higher than a predetermined value or if the first rotational speed of the output member is higher than a predetermined value.

15. The method for controlling an automatic transmission according to claim 7, further comprising:
    detecting whether a brake pedal of the vehicle is depressed; and
    preventing switching from the fixed mode to the reverse rotation prevention mode when the shift position is switched from the reverse drive range to the forward drive range and if the brake pedal is depressed.

16. The method for controlling an automatic transmission according to claim 7, further comprising:
    detecting whether a brake pedal of the vehicle is depressed; and
    preventing switching from the fixed mode to the reverse rotation prevention mode if the brake pedal of the vehicle is not depressed and if the travel speed of the vehicle is higher than a predetermined value.

* * * * *